(12) United States Patent
Tarr et al.

(10) Patent No.: US 7,788,641 B2
(45) Date of Patent: Aug. 31, 2010

(54) SYSTEM AND METHOD FOR IDENTIFYING CONCERNS

(75) Inventors: Peri L. Tarr, Florence, MA (US); Harold L. Ossher, South Salem, NY (US); Stanley M. Sutton, Jr., Chappaqua, NY (US); William H. Harrison, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1277 days.

(21) Appl. No.: 10/802,044

(22) Filed: Mar. 17, 2004

(65) Prior Publication Data

US 2005/0210441 A1    Sep. 22, 2005

(51) Int. Cl.
*G06F 9/44* (2006.01)
*G06F 17/00* (2006.01)

(52) U.S. Cl. .................. 717/125; 717/100; 717/105; 706/48; 706/50

(58) Field of Classification Search .................. None
See application file for complete search history.

(56) References Cited

U.S. PATENT DOCUMENTS

| | | | |
|---|---|---|---|
| 5,860,011 A * | 1/1999 | Kolawa et al. | 717/142 |
| 6,484,155 B1 * | 11/2002 | Kiss et al. | 706/46 |
| 6,748,582 B1 * | 6/2004 | Chiles et al. | 717/111 |
| 6,804,686 B1 * | 10/2004 | Stone et al. | 707/104.1 |
| 2002/0174093 A1 * | 11/2002 | Casati et al. | 707/1 |
| 2002/0198873 A1 * | 12/2002 | Chu-Carroll | 707/3 |

OTHER PUBLICATIONS

"A study of Program Evolution Involving Scattered Concerns", Robillard et al., Mar. 26, 2003. Online retrieved at <www.cs.mcgill.ca/~martin/papers.html>.*
"Capturing Concern Descriptions During Program Navigation", Robillard et al., Dec. 2002. Online retrieved at <www.cs.mcgill.ca/~martin/papers/oopsla2002w.pdf>.*
"FEAT a tool for locating, describing, and analyzing concerns in source code", Robillard et al., May 2003, pp. 1-2. Online retrieved at <http://www.cs.mcgill.ca/~martin/papers.html>.*
"The concern manipulation environment", Tarr et al., Oct. 2004, pp. 29-30, <http://delivery.acm.org/10.1145/1030000/1028681/p29-tarr.pdf>.*
"Concern graphs: finding and describing concerns using structural program dependencies", Robillard et al., May 2002, pp. 406-416, <http://delivery.acm.org/10.1145/590000/581390/p406-robillard.pdf>.*

* cited by examiner

*Primary Examiner*—Tuan Q Dam
*Assistant Examiner*—Thuy Dao
(74) *Attorney, Agent, or Firm*—Vazken Alexanian; McGinn IP Law Group, PLLC

(57) ABSTRACT

A system (and method) for identifying concerns includes a specifying device for specifying at least one initial concern, and an identifying device for identifying at least one related concern having a relationship with at least one initial concern.

28 Claims, 8 Drawing Sheets

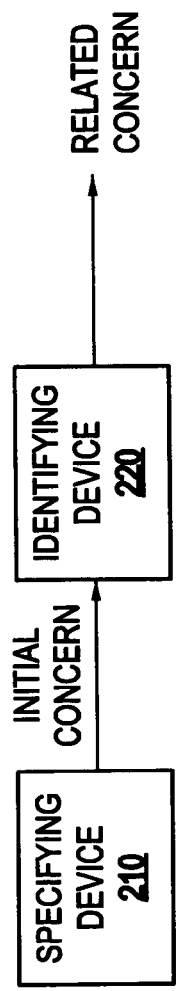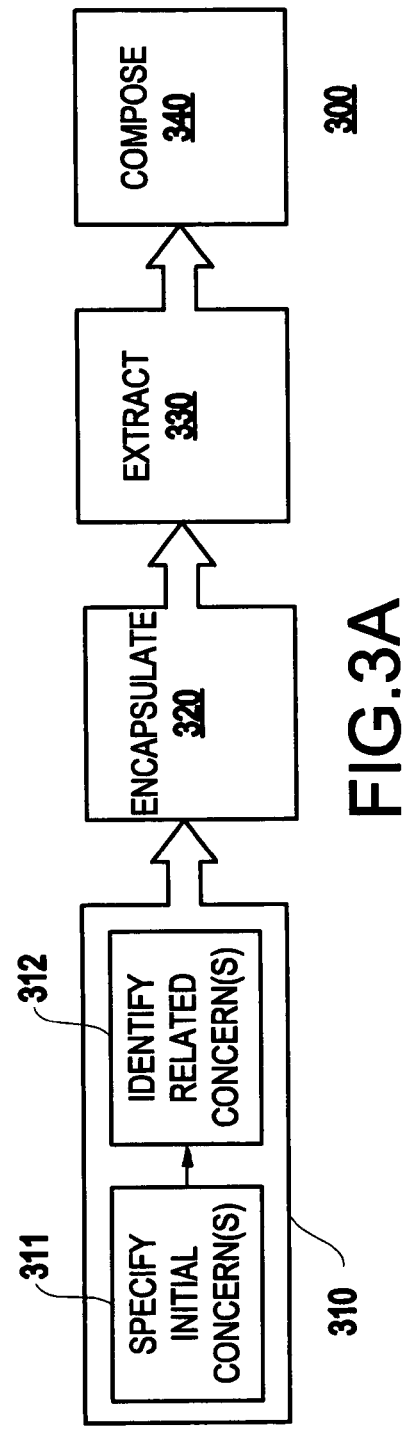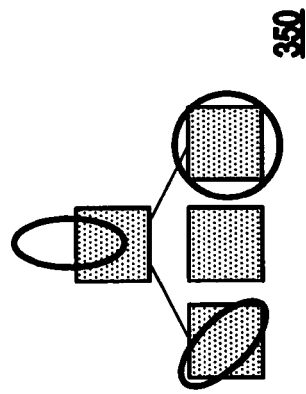

# SYSTEM AND METHOD FOR IDENTIFYING CONCERNS

BACKGROUND OF THE INVENTION

1. Field of the Invention

The present invention relates to a system and method for identifying concerns and, more particularly, a system and method for identifying concerns in which at least one concern having a relationship with at least one initial concern is identified.

2. Description of the Related Art

Concerns include areas of interest within a system. The ability to identify and explore concerns and their relationships within a system is a powerful tool for understanding and restructuring a system.

Developers working on existing programs repeatedly have to address concerns (e.g., features, aspects, areas of interest, etc.) that are not well modularized in the source code comprising a system. In such cases, a developer has to first locate the implementation of the concern in the source code comprising the system, and then document the concern sufficiently to be able to understand it and perform the actual change task.

Conventional approaches available to help software developers locate and manage scattered concerns use a representation based on lines of source code. Such a line-of-code representation makes it difficult to understand the concern and limits the analysis possibilities.

FIG. 1 illustrates a view 100 of a concern representation in one conventional tool (e.g., the Feature Exploration and Analysis Tool (FEAT)) which allows a programmer to locate, describe, and analyze the code implementing a concern in a Java system. Using FEAT, a programmer can locate and analyze concerns scattered in an existing code base.

While tools such as the FEAT tool may allow programmers to find concerns using searches, such tools do not provide a user (e.g., programmer) with an ability to use one concern as a source or information to allow them to identify (e.g., generate) other concerns. Therefore, such conventional tools make it difficult and time-consuming to explore concerns in a program.

SUMMARY OF THE INVENTION

In view of the foregoing and other problems, disadvantages, and drawbacks of the aforementioned assemblies and methods, it is a purpose of the exemplary aspects of the present invention to provide an effective and efficient system and method for identifying concerns.

Specifically, the invention may provide an efficient manner of structuring and exploring a system (e.g., software system) using concerns and, therefore, helps to solve the problem of understanding software systems (e.g., large, complex systems). An important aspect of the present invention is the ability to take an initial concern and identify (e.g., automatically generate) other concerns based on the initial concern. That is, the present invention may use a concern as a point (e.g., starting point) for analysis of a program to automatically generate other concerns. The present invention may also include query and navigation tools to specify and explore concerns within a system using both virtual and actual structuring of different artifacts within the system.

The exemplary aspects of the present invention include a system (and method) for identifying concerns includes a specifying device for specifying at least one initial concern, and an identifying device for identifying (e.g., automatically generating) at least one related concern having a relationship with at least one initial concern. For example, the relationship may include at least one of a call to the at least one initial concern and a call from the at least one initial concern. Further, the initial concern may include a plurality of entities (e.g., a plurality of methods, etc.).

The at least one initial concern and the at least one related concern may include source code in a software system. However, the at least one initial concern and the at least one related concern may also include other than source code (e.g., UML) in a software system. That is, the concern may include any software artifact.

Further, the specifying device may be used to input an initial concern. The specifying device may also include a query tool for inputting a query, such that the initial concern is returned as a result of the query.

The system may also include a navigating device for navigating the software system (e.g., in an integrated development environment (IDE)). For example, the system may be included as part of an integrated development environment (IDE) for displaying the at least one initial and at least one related concern, and navigating the software system.

Specifically, the navigating device may include a graphical user interface (GUI) for using the at least one initial concern and the at least one related concern to explore the software system and construct a new software system. Specifically, the navigating device may include a visual diagram which gives call relations between different parts of a program selected by query operators expressed as regular expressions.

Further, navigating the software system may include, for example, navigating the software system using both virtual and actual structuring of different artifacts within the software system. Navigating the software system may also include using the navigating device to explore concerns and the relationships between the concerns based on a visual representation of query results.

Further, the specifying device may include at least one of a keyboard and a mouse for specifying the at least one initial concern. In addition, specifying the at least one initial concern may include defining a query language comprising a set of operators and evaluation properties that together work to identify concerns within different artifacts that make up a software system.

The present invention also includes a concern manipulation environment (CME) including the system of the present invention. The CME may also include a data structure for keeping concerns in synch with changes in a software system (e.g., by updating a query for defining concerns).

The present invention also includes an integrated development environment (IDE) including the system of the present invention. For example, an exemplary aspect of the present invention includes a system for identifying concerns which includes a specifying device for inputting a query against artifacts related to software development (e.g., software, generated code, or models and information about software), means of displaying the results of the query (e.g., named results which define a concern) and means of updating the query under a condition (e.g., when at least one of new artifacts are introduced, artifacts are deleted, and artifacts are changed).

Another aspect of the present invention is directed to a method of identifying concerns. The method includes specifying at least one initial concern, and identifying (e.g., automatically generating) at least one related concern having a relationship with the at least one initial concern. The method may also include displaying the at least one initial and at least one related concern, and navigating the software system in an integrated development environment (IDE). Further the at least one initial concern may be an extensional concern, an intensional concern, or some combination of extensional and intensional concerns and may also be defined by a relation to another concern.

Another aspect of the present invention is directed to a method of generating concerns which includes identifying a first concern, examining a program using the first concern, identifying a second concern using the first concern and to text of the program or any representation of an artifact, and displaying and navigating concerns in an integrated development environment (IDE).

The present invention also includes a programmable storage medium tangibly embodying a program of machine-readable instructions executable by a digital processing apparatus to perform a method of identifying concerns, the method of the present invention. The present invention also includes a method for deploying computing infrastructure in which computer-readable code is integrated into a computing system, such that the code and the computing system combine to perform the method according the present invention.

In another exemplary aspect, the present invention includes a programmable storage medium tangibly embodying a program of machine-readable instructions executable by a digital processing apparatus to perform the inventive method.

In another exemplary aspect, the present invention includes a method for deploying computing infrastructure in which computer-readable code is integrated into a computing system, such that the code and the computing system combine to perform the inventive method.

With its unique and novel features, the exemplary aspects of the present invention provides an effective and efficient system and method for identifying concerns. The invention provides an efficient manner of structuring and exploring a system (e.g., software system), using concerns and, therefore, helps to solve the problem of understanding software systems (e.g., large, complex systems).

BRIEF DESCRIPTION OF THE DRAWINGS

The foregoing and other objects, aspects and advantages will be better understood from the following detailed description of the exemplary embodiments of the invention with reference to the drawings, in which:

FIG. 2 illustrates a system 200 for identifying concerns according to the exemplary aspects of the present invention;

FIGS. 3A-3E illustrate an exemplary method 300 by which the present invention may be used on existing software, according to the exemplary aspects of the present invention;

DETAILED DESCRIPTION OF THE EXEMPLARY EMBODIMENTS OF THE INVENTION

Figure 1:
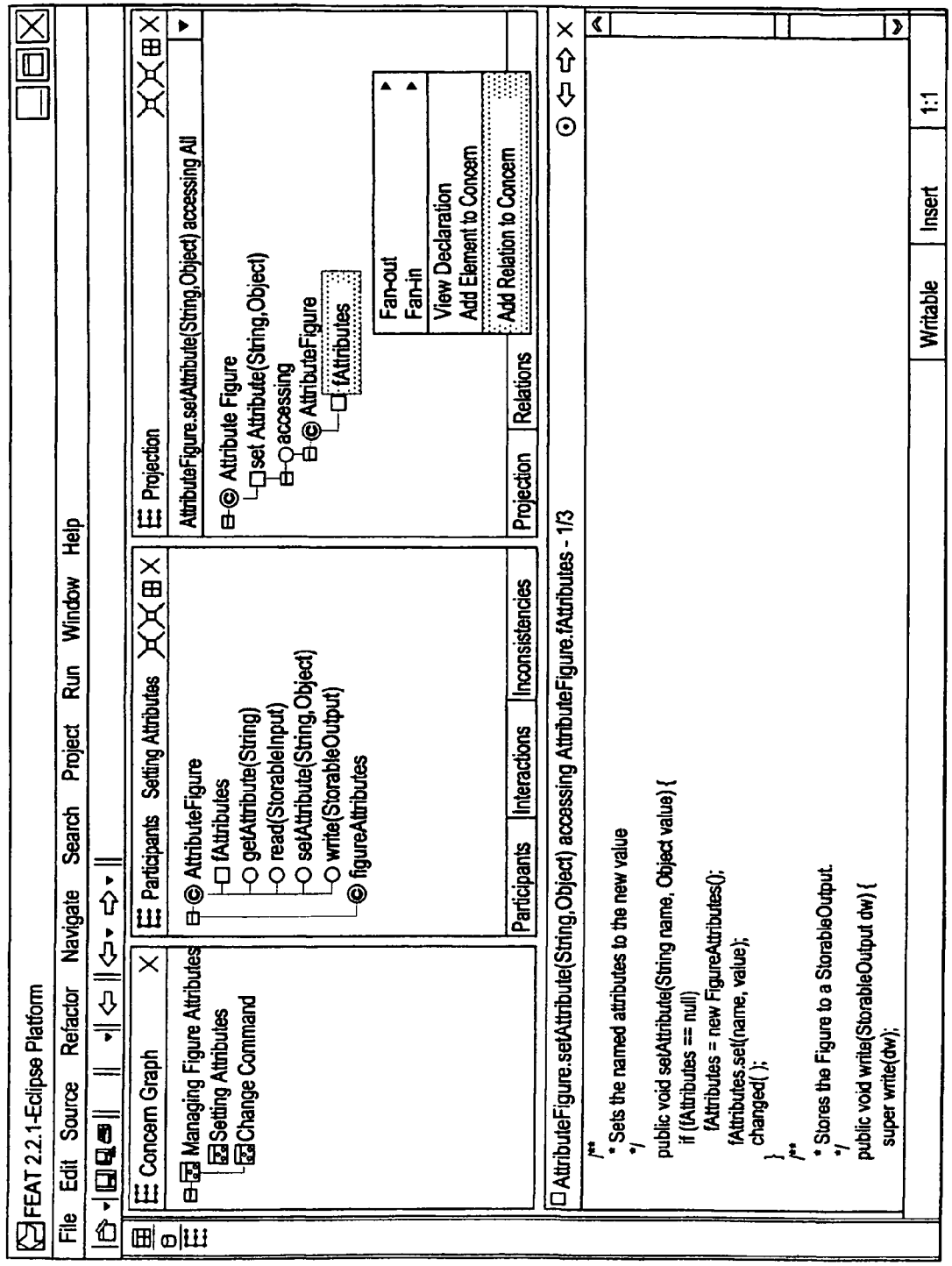
FIG. 1 illustrates a view 100 of a concern representation in one conventional tool (e.g., the Feature Exploration and Analysis Tool (FEAT)) for programming in a Java system.

Referring now to the drawings, FIG. 2 illustrates a system 200 for identifying concerns in accordance with the exemplary aspects of the present invention.

The system 200 includes a specifying device 210 for specifying at least one initial concern (e.g., a plurality of initial concerns). It should be noted that a "specifying device" should be construed herein to mean anything that can be used to specify (e.g., provide, identify, etc.) a concern. For example, the specifying device may include an input device (e.g., keyboard, mouse) or a query tool (e.g., a tool for inputting a query which returns at least one concern as a query result), or analysis tool, etc.

The system 200 also includes an identifying device 220 (e.g., at least one microprocessor) for identifying at least one related concern (e.g., a plurality of related concerns) having a relationship with the at least one initial concern. The system 200 may include, for example, a graphical user interface (GUI) (e.g., personal computer) which may include a display device, keyboard, mouse, memory device, microprocessor, printer, etc.

The system 200 may be used to develop a software system (e.g., program), and in particular, a program using aspect-oriented programming techniques. The software program will typically be in the form of byte code compiled from one or more software entities defining primary program functionality, as well as one or more aspects defining cross-cutting issues.

The present invention allows a user (e.g., programmer) to locate, describe, and analyze the code implementing a concern (e.g., in a Java system). Specifically, the present invention allows a user to identify (e.g., locate and analyze) concerns included in a program code (e.g., scattered in an existing code base).

Further, the present invention (e.g., including a graphical user interface) may allow the user to visually navigate structural program dependencies. Thus, the user can locate the code implementing a concern, and store the result as an abstract representation consisting of building blocks that are easy to manipulate and query.

The representation of a concern supported by the present invention can be used to investigate the relationships between the captured concern and the base code, and between the different parts of the concern itself. The representation can also be used to keep track of the actual source code implementing the concern.

The present invention allows a user to capture concerns using an abstract representation that can be mapped back to source code, instead of working directly at the level of program text. Thus, the abstract representation can help the user manage the code in a concern.

Moreover, unlike conventional tools, such as the FEAT tool, the present invention provides a user with an ability easily generate (e.g., automatically generate) other concerns. Specifically, unlike conventional systems, the present invention allows the user to identify at least one related concern having a relationship (e.g., a link) with the at least one initial concern. The relationship may be predetermined by the user, or the relationship may be a relationship that is identified (e.g., determined) by the system 200, such as through data mining, pattern matching, etc.

The particular type of relationship is not necessarily limited. Indeed, there may be only one concern with "any identifiable or computable" relationship to something else. Some examples of the relationship may include, for example, the related concern includes a call to the initial concern, and/or a call from the initial concern, and/or classes that can be created (e.g., using the "new" verb) by the concern or from the concern, and/or the related concern may reference the same data as the initial concern, and/or the relationship may include a union or intersection of two concerns, etc.

The present invention helps to allow the user to "pull apart" a software system by "extracting" related concerns. Thus, the present invention makes it easy and efficient to identify (e.g., explore, analyze, generate, etc.) concerns in a program.

In one exemplary embodiment, the at least one initial concern is directly input using the specifying device 210 (e.g., by specifying one or more elements of the concern). The initial concern may also be generated by some form of analysis. In another exemplary embodiment of the present invention the specifying device 210 may be used to input a query (e.g., keyword-based query) for identifying an initial concern. The present invention may search a software system for areas of interest (e.g., concerns) which match the input query (e.g., include the input keyword, etc.). That is, the results of the input query may include the initial concern.

More specifically, the present invention may work by defining a query language composed of a set of operators and evaluation properties that together work to select specific concerns within the different artifacts that make up a system. These initial concerns may be used to generate (e.g., automatically generate) a set of additional, new concerns.

A navigation tool (e.g., graphical user interface (GUI)) may be used, based on a visual representation of the query results, to explore both the concerns (e.g., initial and related concerns) and the relationships between them. For example, the navigation tool may include a visual diagram (e.g., display screen, view, etc.) which displays call relations between different parts of a system selected by query operators expressed as regular expressions.

The present invention may include, for example, a concern manipulation environment (CME). The CME may include an open, extensible suite of tools that support programming (e.g., aspect-oriented development (AOSD)) across the full software lifecycle.

Further, the present invention may include an integrated development environment (IDE) for users (e.g., commercial and research-oriented developers) who want to use technologies (e.g., aspect-related technologies) to simplify and improve their existing or new software.

The present invention may support the full software lifecycle. Software may include requirements, use cases, design, specification, architecture, test, analysis, etc. Further, there are more artifacts than just code that comprise any software system. Today's software also includes artifacts written in UML, BPEL, WSDL, XML, XMI, HTML and other documentation formats, Ant. Thus, concerns and aspects are heterogeneous, including pieces of many different artifacts. The system 200 may operate on any such artifact.

The present invention may include a gentle adoption curve and a low entry barrier. The invention may work with new or existing software, whether or not the software is/was originally developed using AOSD technologies.

The invention can be applied to all or part of any given piece of software, allowing it to be adopted incrementally in a given project. It may be non-invasive and work with existing programming languages, artifacts, and processes. Developers do not have to rewrite existing software, change languages, or adopt different processes to use the invention.

Developers can derive significant benefit from the invention, even if they do not buy into AOSD. The invention may be implemented in standard Java, and work on any platform that supports Java.

Further, the present invention allows users (e.g., developers) to leverage a variety of powerful AOSD tools, technologies, and paradigms (e.g., simultaneously). Different tools, technologies, and paradigms can help developers accomplish different development, integration, and evolution tasks. Initially, the invention provides integrated support for at least two important AOSD paradigms: AspectJ and multidimensional separation of concerns using Hyper/J2. The invention may incorporate and integrate other new or existing aspect-oriented paradigms, tools, and technologies.

The present invention includes a framework for building and integrating AOSD tools, technologies, and paradigms for researchers and technology providers. The invention offers a flexible, powerful, open set of components, frameworks, and GUIs on which to build tools more easily and rapidly. The components are based on a common meta-model for AOSD tools.

The invention framework allows technology providers and researchers to focus on the "value-added" part of their work, instead of having to implement fundamental capabilities from scratch. This facilitates tool building, experimentation with different aspect-oriented approaches, and further research.

In addition, the invention includes an extensible, reusable, open, customizable, integrating base on which users (e.g., AOSD tool developers) can build and integrate tools. The invention may include an open, customizable set of underlying abstractions that are common to a wide range of aspect-oriented tools, technologies, and paradigms. The invention may also offer a large set of open points and integration points. The invention may also offer a common platform on which different tools (e.g., aspect-related tools), technologies, and paradigms can interoperate and be integrated.

For example, the invention may ultimately provide a wide range of integrated tools that promote different software development, integration, evolution, and deployment activities. The invention may, for example, include the use of AOSD-related technologies to reduce and manage the complexity of existing software, and create new software, or to extend existing software.

An exemplary aspect of the present invention works by improving separation of concerns in software. A concern may include part of a software system that relates to some concept, goal, purpose, or requirement. Some common examples of concerns are features, components, variants, user interfaces, instrumentation, first-failure data capture (FFDC), quality of service (QoS), security, policies, etc.

Separation of concerns is an important part of all software engineering, and all software engineers think in terms of concerns. However, conventional development paradigms—including object oriented—do not allow developers to encapsulate all of their concerns explicitly.

For example, the code that implements instrumentation is typically scattered all throughout the implementation of software, even though "instrumentation" is a coherent concern that a developer would like to work with as a single, encapsulated entity. The present invention allows a user (e.g., a software engineer) to make any desired concerns explicit in their software, eliminating the problems of scattering and tangling.

The present invention may accomplish this by recognizing "concerns" as real entities in software. Specifically, the present invention allows developers to identify, encapsulate, and manipulate concerns in software, thus enabling software to be structured into understandable, manageable, evolvable parts.

Figure 4:
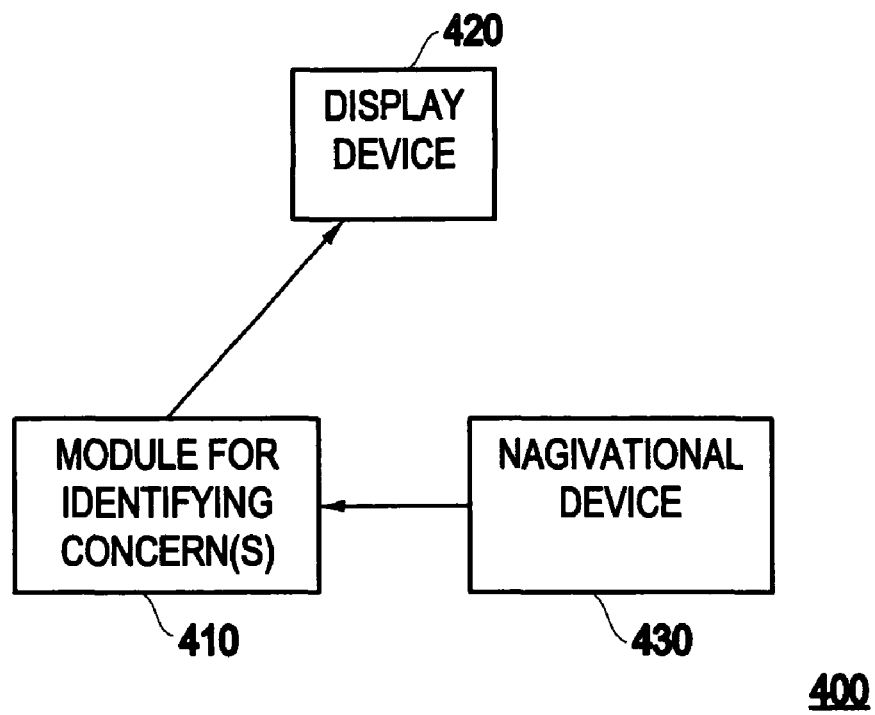
FIG. 4 illustrates an integrated development environment (IDE) 400 for developing software according to the exemplary aspects of the present invention.
Figure 5A:
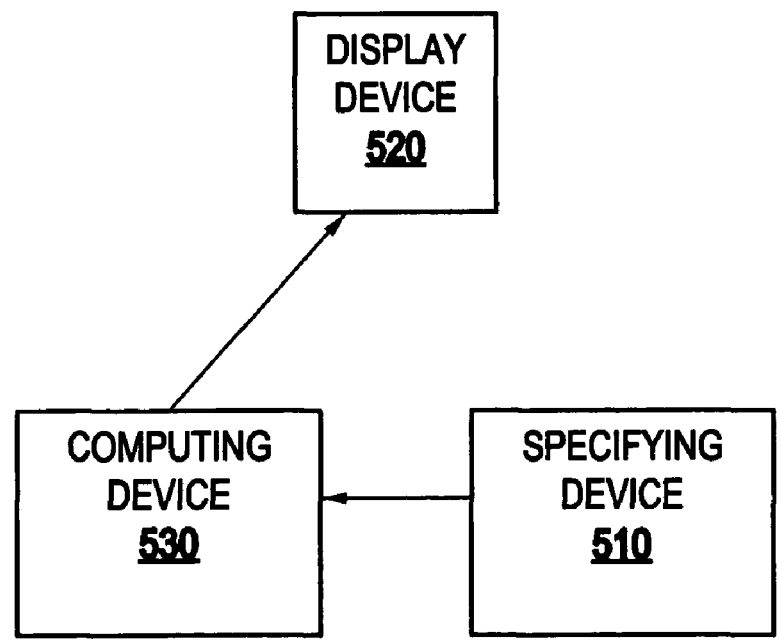
FIG. 5A illustrates a system 500 for identifying concerns which keeps track of what a concern is as the software changes, according to the exemplary aspects of the present invention.
Figure 7:
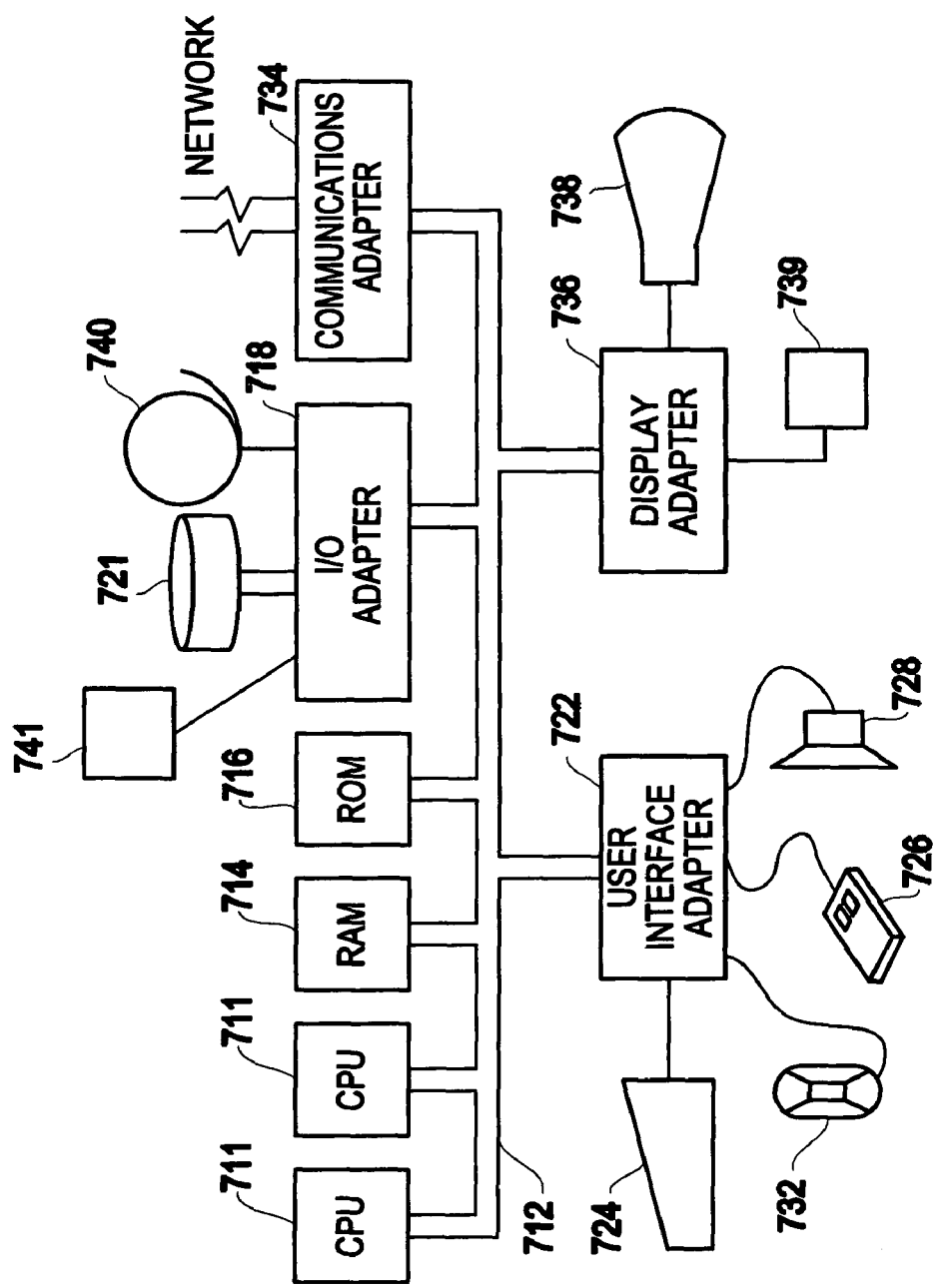
FIG. 7 illustrates a system 700 which is a typical hardware configuration which may be used for implementing the inventive system and method.

FIG. 3A illustrates an exemplary method 300 by which the present invention may be used on existing software. When used to understand, enhance, and evolve existing software, the activities of identifying concerns (310), encapsulating concerns (320), extracting (e.g., manipulating) concerns (330), and composing software (340) are very common. Further, the method 300 may be implemented using the system 400, system 500 or hardware configuration 700, which are illustrated in FIGS. 4, 5A and 7, respectively.

As illustrated in FIG. 3A, identifying concerns (310) in the exemplary method 300 includes specifying 311 at least one initial concern, and identifying 312 at least one related concern. Further, with respect to identifying concerns (310), software may address a variety of concerns, many of which, like logging, were not encapsulated into modules. The concern identification activity attempts to answer questions such as, "which parts of this software system pertain to this feature, function, or other concern?" For example, FIG. 3B illustrates a simple software system 350 having parts (encircled) which have been identified as pertaining to an area of interest.

In the present invention, concern identification may involve exploring software artifacts using a combination of navigation and queries (e.g., pattern-matching), analysis and mining (e.g., data mining), views that are provided for creating and navigating concern models, which contain concerns, relationships, and constraints, and for issuing queries over concern models, and viewing and refining results. For example, in the present invention, it may be possible to use concern identification to find latent concerns, like logging, that are scattered across existing software.

Figure 3C:
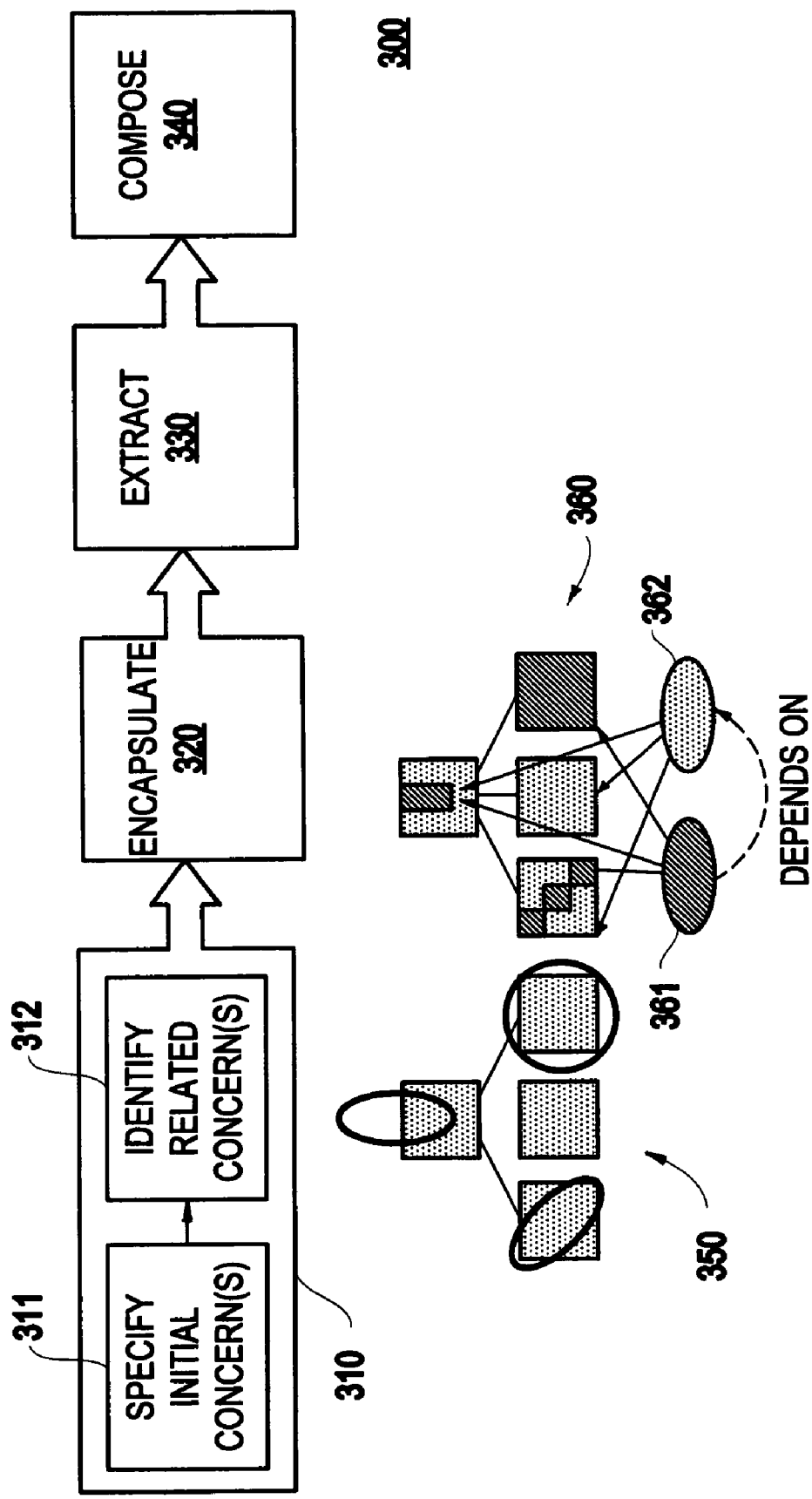

FIG. 3C illustrates the exemplary method 300, and also illustrates a simple software system 360 in which concerns (e.g., shaded page portions) have been encapsulated (320). That is, once concerns have been identified in existing software, they can be encapsulated as first-class concerns in the concern model, as shown in FIG. 3C.

Artifacts can be encapsulated in concerns in several manners. For example, artifacts can be encapsulated extensionally, by explicitly selecting all of the pieces of software that a concern includes (e.g., all of the classes and methods that implement or use logging). Artifacts can also be encapsulated intensionally, by query. For example, a concern might be defined to contain all of the classes with "Log" in their names, and all methods containing calls to methods defined by classes named Log*. When new artifacts are added that match the query that defines such a concern, those new artifacts may be added to the concern.

It should be noted that intensional concerns are not the same as the old database notion of "views," because a view is not a first-class thing. Since the present invention can extract concerns, the concerns are, in fact, first-class entities and can be manipulated sensibly as such, which views can not be. Moreover, a database view operates over tables. Here, the present invention may operate on among other things, such as software entities, and using relationships appropriate to the kind of artifact the concern is a part of.

That is, the present invention supports concerns as first-class entities and can make them understandable in isolation via extraction. The present invention also supports concerns that have both extensional and intensional parts.

Database views, on the other hand, are not first-class entities in this sense—traditionally, but instead are considered projections from the database. Concerns are not restricted to being projections, and in fact, when extracted, they are not projections at all. The present invention treats concerns as first-class entities which is unique and is not standard in AOSD, because it requires a symmetric view.

Concerns, their interrelationships, and their constraints may be represented in the concern model. For example, FIG. 3C shows that the dark-shaded concern 361 depends on the light-shaded concern 362.

The present invention may include a "concern explorer" which allows a user to view, navigate, and query concern models. Once concerns have been encapsulated, the concerns can be treated as though the software had been written with them separated explicitly, even though the concerns are still physically entangled with other concerns. That is, the separation may be logical, not physical at this point. Additional (e.g., subsequent) queries can be issued using these concerns (for example, to understand the interrelationships among concerns), and relationships (e.g., dependencies) and constraints (e.g., mutual exclusion) among concerns can be represented, analyzed, and enforced.

It should be noted that the present invention in not necessarily invasive. Thus, a user can use the present invention (e.g., concern identification and encapsulation) to gain benefit with respect to organizing and understanding his software, whether or not he actually uses AOSD.

Figure 3D:
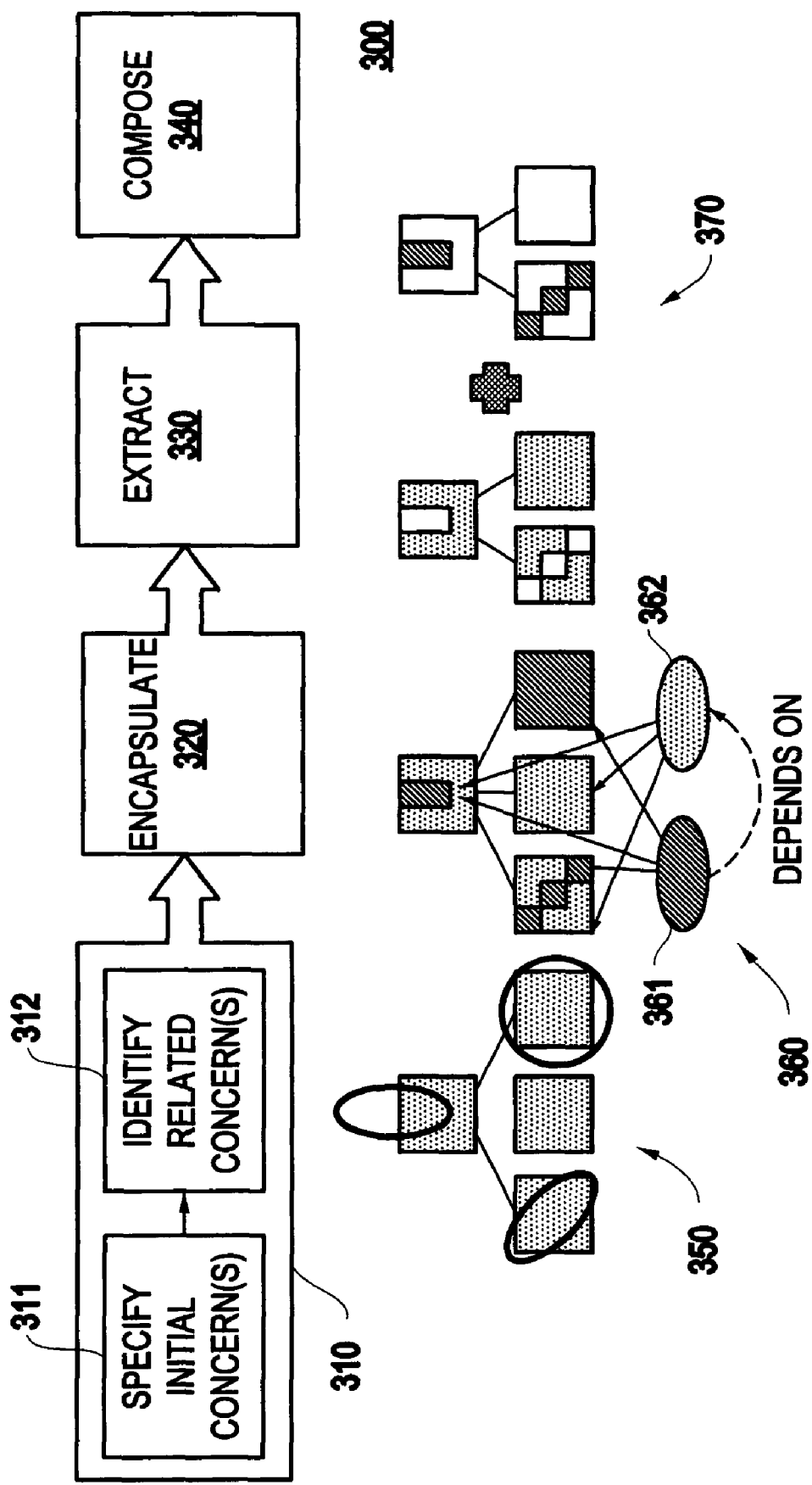

FIG. 3D illustrates the exemplary method 300, and also illustrates a simple software system 370 in which concerns (e.g., white (e.g., non-shaded) page portions) have been extracted (330). As noted above, the encapsulation (320) may result in a logical separation of concerns. For many purposes, this degree of separation is sufficient. For some kinds of concerns, however, a user (e.g., developer) may want to go a step further, and physically separate the concerns, extracting (330) the concerns into separate artifacts.

As an example, if the dark shaded concern 361 above represents logging and the lightly-shaded concern 362 represents a server application, a user might decide to extract the logging concern from the server, so that the code that implements the server no longer is tangled with the logging capability. This would enable the server to be shipped without logging, and allow the development of the server and the logging concerns to proceed independently.

The present invention supports concern extraction at least into Java and/or AspectJ, as well as into other types of artifacts. To ensure that the extracted artifacts are consistent, correct, and separately compilable, the extractor may insert stubs where needed to ensure declarative completeness. The extracted artifacts can be subsequently reintegrated (e.g., via composition).

Figure 3E:
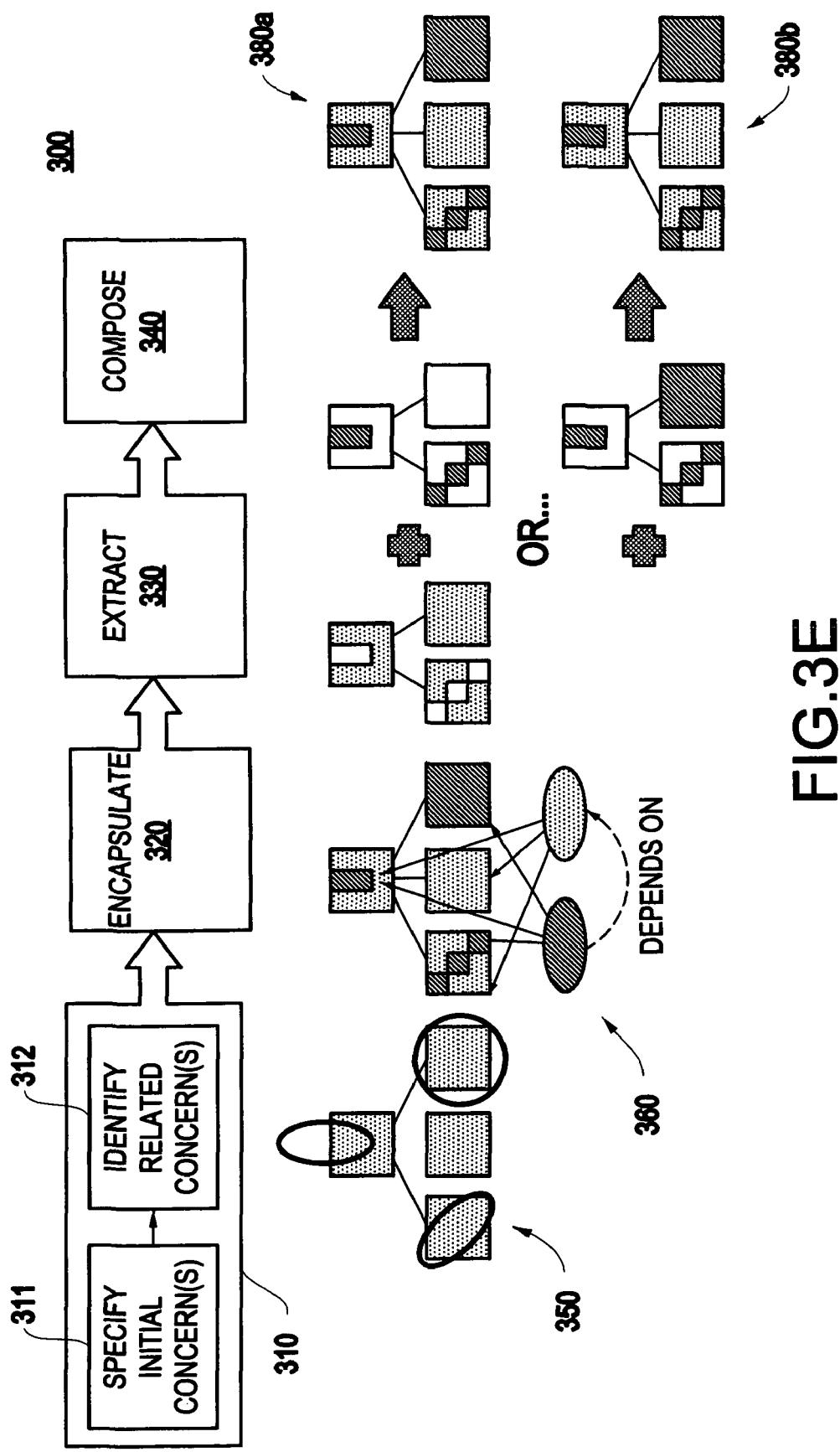

FIG. 3E illustrates the exemplary method 300, and also illustrates a possible simple software systems 380 in which concerns (e.g., shaded page portions) have been composed (e.g., reintegrated). Specifically, concerns that have been separated can be integrated, or composed (e.g., woven), together to produce software that contains the functionality of all the concerns:

As illustrated in FIG. 3E, the separated shaded and non-shaded concerns (logging and server capabilities) can be composed together optionally to produce a version 380a of the software that integrates both capabilities (server with logging). Note that it is also possible to compose the server with some other capability encapsulated by a concern, such as first-failure data capture to produce another version 380b of the software.

The present invention supports at least two composition capabilities: AspectJ, which is suited to homogeneous crosscutting concerns, and Hyper/J2, which emphasizes heterogeneous crosscutting concerns. The invention is open to integration with other compositors as well. It may be noted that the choice of compositor is not necessarily relevant with respect to concern modeling, identification, or encapsulation, but may be somewhat relevant during extraction (e.g., for knowing into which language the artifacts should be extracted).

FIG. 4 illustrates another exemplary aspect of the present invention. As illustrated in FIG. 4, the present invention may include an integrated development environment (IDE) 400 for developing software. Specifically, the system 200 may be included as part of an integrated development environment (IDE) 400 which allows a user to quickly and easily create and debug programs (e.g., aspect-oriented programs).

An integrated development environment (IDE) typically refers to a set of integrated tools for developing software. The tools may be generally run from a graphical user interface (GUI) (e.g., a single user interface), but each tool may also be implemented with its own user interface. For example, as illustrated in FIG. 4, the IDE may include a module 410 for identifying concerns (e.g., identifying at least one related concern having a relationship with at least one initial concern. For example, the module 410 may include a processor for executing a software program for identifying concerns. The IDE 400 may also include a display device 420 for displaying information (e.g., query, query results, etc.), and a navigational device (e.g., keyboard, mouse, etc.) 430 for navigating concerns in a software system. Specifically, the navigational device 430 may be used to edit the underlying software artifacts.

Figure 5B:
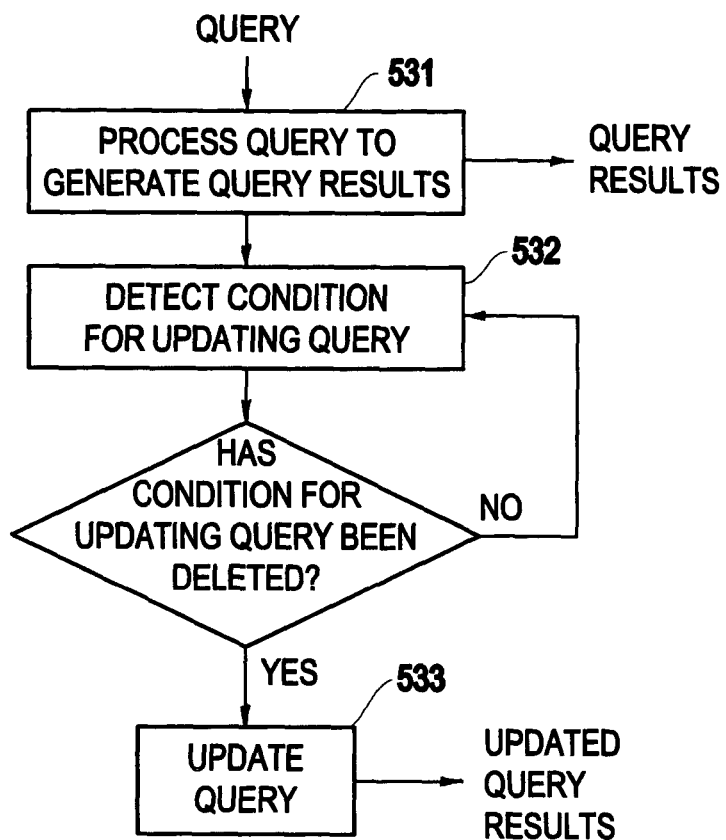
FIG. 5B illustrates an exemplary algorithm which may be executed by the computing device 530 in the system 500, according to the exemplary aspects of the present invention.
Figure 6:
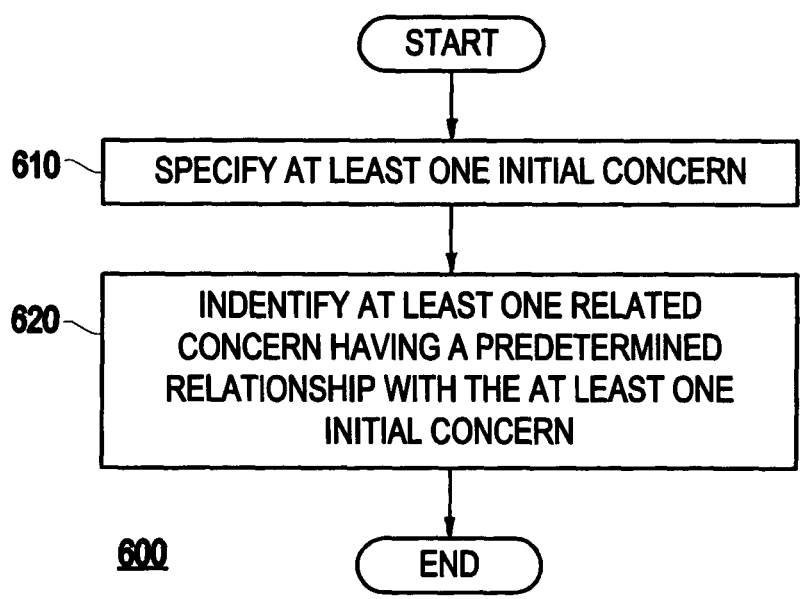
FIG. 6 illustrates a method 600 of identifying concerns, according to the exemplary aspects of the present invention.

FIGS. 5A-5B illustrate another exemplary aspect of the present invention. Specifically, the present invention may include a system 500 for identifying concerns which may keep track of what a concern is as the software changes. For example, the system 500 may be included as part of an Integrated Development Environment (IDE).

As illustrated in FIG. 5A, the system 500 includes a specifying device 510 for inputting a query against artifacts related to software development a specifying. Such artifacts may include, for example, software, generated code, models and information about software, etc. The system 500 may also include a display device 520 for displaying information such as the query, the results of the query, etc. The system 500 may also include a computing device (e.g., processor) 530 which updates (e.g., renews, reprocesses, recomputes, reevaluates, reconfigures, reconstitutes, etc.) the query under certain conditions, such as when at least one of new artifacts are introduced, artifacts are deleted, and artifacts are changed. Another query may include, for example, when a user requests an update, or after a certain duration. This allows the invention to keep the concerns in synch with the program as the program changes.

For example, the query was "all methods starting with AD" may be processed to generate results which include "method ADD" and "method ADE". If the user then adds "method ADF" to the program and then requests that the query be updated (e.g., a condition for updating the query), the system 500 will update the query such that "method ADF" will be added to the query results.

For example, the system 500 may be self-refining (e.g., having a learning capability) which allows it to keep track of what a concern is (e.g., how a concern is defined) as the software at issue changes. For example, the definition of concern may be changed (automatically changed) by the system, as a result of a change in the software is changed.

FIG. 5B illustrates an exemplary algorithm which may be executed by the computing device 530 in the system 500. As illustrated in FIG. 5B, the algorithm executed by the computing device (e.g., processor) 530 may include processing (531) a query to generate query results. The query results may be displayed by a display device, and may also be used to identify related concerns, as explained above with respect to system 200. The computing device 530 may also detect (532) a condition for updating the query (e.g., when at least one of new artifacts are introduced, artifacts are deleted, artifacts are changed, after a duration of time, etc.). Further, if a condition for updating the query has been detected, the query may be updated (533) to generate updated query results which may be displayed, etc.

In another exemplary aspect, the present invention includes a method 600 of identifying concerns. The method 600 includes specifying (650) at least one initial concern, and identifying (660) at least one related concern having a relationship with the at least one initial concern. Specifically, in the method, a second concern may be identified using the first concern and the program text (e.g., software system text). The method 600 may also include displaying and navigating the concerns in an integrated development environment (IDE). Further, the first concern may include at least one of an intensional concern and an extensional concern.

Referring now to FIG. 7, system 700 illustrates a typical hardware configuration which may be used for implementing the inventive system and method for identifying a word correspondence. The configuration has preferably at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, and Intranet, a personal area network (PAN), etc., and a display adapter 736 for connecting the bus 712 to a display device 738 and/or printer 739. Further, an automated reader/scanner 741 may be included. Such readers/scanners are commercially available from many sources. In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 711 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 711 and hardware above, to perform the method of the invention.

Figure 8:
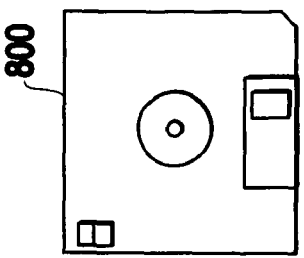
FIG. 8 illustrates a programmable storage medium 900 (e.g., floppy disk) tangibly embodying a program of machine-readable instructions executable by a digital processing apparatus to perform the inventive method.

This signal-bearing media may include, for example, a RAM contained within the CPU 711, as represented by the fast-access storage for example. Alternatively, the instructions may be contained in another signal-bearing media, such as a magnetic data storage diskette 800 (FIG. 8), directly or indirectly accessible by the CPU 711.

Whether contained in the computer server/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as C, C++, etc.

With its unique and novel features, the present invention provides an efficient manner of structuring and exploring a system (e.g., software system) using concerns and, therefore, helps to solve the problem of understanding software systems (e.g., large, complex systems).

While the invention has been described in terms of one or more embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim in the present application should be construed as a disclaimer of any interest in or right to an equivalent of any element or feature of the amended claim.

What is claimed is:

1. A method of identifying concerns, comprising:
specifying an initial concern in a software system, said specifying said initial concern including defining a query language comprising a set of operators and evaluation properties that together work to identify concerns within different artifacts that make up the software system;
using the initial concern to explore artifacts in said software system and, based on a result of said using the initial concern to explore artifacts in said software system, identifying a related concern in said software system having a relationship with said initial concern, at least one of the initial and related concerns comprising an artifact other than source code, said identifying said related concern comprising automatically computing a content of said related concern based on said initial concern and said relationship between said initial and related concerns by exploring artifacts in said software system to determine said relationship by using one of pattern-matching and data mining;
displaying said initial concern and said related concern; and
navigating said software system in an integrated development environment (IDE),
wherein said relationship comprises at least one of a call to said initial concern and a call from said initial concern,
wherein said specifying said initial concern comprises using a query tool for inputting a query, such that said initial concern is returned as a result of said query,
wherein said initial concern comprises at least one of an extensional concern and an intensional concern, and
wherein at least one of said initial concern and said related concern comprises a unified modeling language (UML) artifact.

2. A method of generating concerns, comprising:
identifying a first concern in a software system, said identifying said first concern including defining a query language comprising a set of operators and evaluation properties that together work to identify concerns within different artifacts that make up the software system;
examining a program using said first concern and text of said program;
identifying a second concern in said software system based on a result of said examining said program using said first concern and text of said program, at least one of the first and second concerns comprising an artifact other than source code said identifying said second concern comprising automatically computing a content of said second concern based on said first concern and said relationship between said first and second concerns by exploring artifacts in said software system to determine said relationship by using one of pattern-matching and data mining; and
displaying and navigating concerns in an integrated development environment (IDE),
wherein at least one of said first concern and said second concern comprises a unified modeling language (UML) artifact.

3. A system for identifying concerns, comprising:
a specifying device for specifying an initial concern in a software system, said specifying said initial concern including defining a query language comprising a set of operators and evaluation properties that together work to identify concerns within different artifacts that make up the software system; and
an identifying device for:
using the initial concern to explore artifacts in said software system; and
based on a result of said using the initial concern to explore artifacts in said software system, identifying a related concern in said software system having a relationship with said initial concern, at least one of the initial and related concerns comprising an artifact other than source code,
wherein said identifying said related concern comprises automatically computing a content of said related concern based on said initial concern and said relationship between said initial and related concerns, by exploring artifacts in said software system to determine said relationship by using one of pattern-matching and data mining, and
wherein at least one of said initial concern and said related concern comprises a unified modeling language (UML) artifact.

4. The system according to claim 1, wherein said initial concern comprises a plurality of entities.

5. The system according to claim 1, wherein said relationship comprises a call to said initial concern.

6. The system according to claim 1, wherein said relationship comprises a call from said initial concern.

7. The system according to claim 1, wherein said relationship comprises a same class that can be created by the concern, a same class that can be created from the concern, a reference to same data as the initial concern, and a union or intersection of two concerns.

8. The system according to claim 1, wherein said specifying device comprises a query tool for inputting a query, such that said initial concern is returned as a result of said query.

9. The system according to claim 8, further comprising:
a navigating device for navigating said software system in an integrated development environment (IDE).

10. The system according to claim 9, wherein said navigating device comprises a graphical user interface (GUI) for using said initial concern and said related concern to explore said software system and construct a new software system.

11. The system according to claim 9, wherein said navigating said software system comprises navigating said software system using both virtual and actual structuring of different artifacts within said software system.

12. The system according to claim 9, wherein said navigating said software system comprises using said navigating device to explore concerns and the relationships between said concerns based on a visual representation of query results.

13. The system according to claim 9, wherein said navigating device comprises a visual diagram which gives call relations between different parts of a program selected by query operators expressed as regular expressions.

14. The system according to claim 8, wherein said system is part of an integrated development environment (IDE) for displaying said initial concern and said related concern, and navigating said software system.

15. The system according to claim 3, wherein said initial concern and said related concern comprise source code in said software system.

16. The system according to claim 1, wherein said identifying said related concern comprises automatically generating said related concern.

17. The system according to claim 1, wherein said specifying device comprises at least one of a keyboard and a mouse for specifying said initial concern.

18. The system according to claim 1, wherein said initial concern and said related concern comprise a part of said software system which relates to some concept, goal, purpose or requirement.

19. The system according to claim 1, wherein said initial concern and said related concern comprise at least one of a feature, component, variant, user interface, instrumentation, first-failure data capture, quality of service, security, and policy.

20. The system according to claim 1, wherein said identifying said related concern comprises generating a concern model which represents said initial and related concerns, a relationship between said initial and related concerns, and a constraint on said initial and related concerns.

21. The system according to claim 20, further comprising:
a concern explorer for viewing, navigating and querying said concern model.

22. The system according to claim 21, wherein at least one of the initial concern and the related concern is displayed by the concern explorer as an abstract representation which includes manipulatable building blocks and is mapped back to source code, and
wherein the concern explorer allows a user to encapsulate a plurality of artifacts in the related concern which results in a logical separation of concerns, extract a plurality of artifacts from the related concern, and compose a concern from the plurality of extracted artifacts.

23. A concern manipulation environment (CME) comprising the system of claim 1.

24. The concern manipulation environment of claim 23, wherein a data structure is maintained for keeping concerns in sync with changes in a software system.

25. A system for identifying concerns, comprising:
a specifying device for specifying a query against artifacts related to software development, including software, generated code, or models and information about software, said query comprising an initial concern, said specifying said query including defining a query language comprising a set of operators and evaluation properties that together work to identify concerns within different artifacts that make up the software system;
means for displaying the results of the query, said results comprising a related concern having a relationship with said initial concern, at least one of the initial and related concerns comprising an artifact other than source code,
means for automatically computing a content of said related concern based on said initial concern and said relationship between said initial and related concerns by exploring artifacts in said software system to determine said relationship by using one of pattern-matching and data mining; and
means for updating the query when at least one of new artifacts are introduced, artifacts are deleted, and artifacts are changed,
wherein at least one of said initial concern and said related concern comprises a unified modeling language (UML) artifact.

26. The system of claim 25, wherein said results of said query comprise a concern.

27. A programmable storage medium tangibly embodying a program of machine-readable instructions executable by a digital processing apparatus to perform a method of identifying concerns, said method comprising:
specifying an initial concern in a software system, said specifying said initial concern including defining a query language comprising a set of operators and evaluation properties that together work to identify concerns within different artifacts that make up the software system;
using the initial concern to explore artifacts in said software system and, based on a result of said using the initial concern to explore artifacts in said software system, identifying a related concern in said software system having a relationship with said initial concern, at least one of the initial and related concerns comprising an artifact other than source code, wherein said identifying said related concern comprises automatically computing a content of said related concern based on said initial concern and said relationship between said initial and related concerns by exploring artifacts in said software system to determine said relationship by using one of pattern-matching and data mining, and
wherein at least one of said initial concern and said related concern comprises a unified modeling language (UML) artifact.

28. A method for deploying computing infrastructure in which computer-readable code is integrated into a computing system, such that said code and said computing system combine to perform a method of identifying concerns, said method of identifying concerns comprising:
  specifying an initial concern in a software system, said specifying said initial concern including defining a query language comprising a set of operators and evaluation properties that together work to identify concerns within different artifacts that make up the software system;
  using the initial concern to explore artifacts in said software system and, based on a result of said using the initial concern to explore artifacts in said software system, identifying a related concern in said software system having a relationship with said initial concern, at least one of the initial and related concerns comprising an artifact other than source code,
  wherein said identifying said related concern comprises automatically computing a content of said related concern based on said initial concern and said relationship between said initial and related concerns by exploring artifacts in said software system to determine said relationship by using one of pattern-matching and data mining, and
  wherein at least one of said initial concern and said related concern comprises a unified modeling language (UML) artifact.

* * * * *